United States Patent
Nangare et al.

(10) Patent No.: US 12,254,899 B1
(45) Date of Patent: Mar. 18, 2025

(54) DIGITAL TIMING RECOVERY IN HARD DISK DRIVE READ CHANNEL FOR PREAMBLE REDUCTION

(71) Applicant: Marvell Asia Pte Ltd, Singapore (SG)

(72) Inventors: Nitin Nangare, Sunnyvale, CA (US); William J. Mitchem, Broomfield, CO (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 18/585,362

(22) Filed: Feb. 23, 2024

Related U.S. Application Data

(60) Provisional application No. 63/451,204, filed on Mar. 9, 2023, provisional application No. 63/449,933, filed on Mar. 3, 2023.

(51) Int. Cl.
*G11B 20/10* (2006.01)

(52) U.S. Cl.
CPC .. *G11B 20/10222* (2013.01); *G11B 20/10046* (2013.01); *G11B 20/10268* (2013.01)

(58) Field of Classification Search
None
See application file for complete search history.

(56) References Cited

U.S. PATENT DOCUMENTS

| | | | | |
|---|---|---|---|---|
| 5,696,639 | A * | 12/1997 | Spurbeck | G11B 20/10009 |
| 6,307,900 | B1 * | 10/2001 | Choi | G11B 20/1403 |
| 9,025,265 | B1 * | 5/2015 | Dziak | G11B 20/10027 360/39 |
| 9,257,146 | B1 * | 2/2016 | Wang | G11B 20/10268 |
| 10,109,314 | B1 * | 10/2018 | Kobayashi | G11B 20/10222 |
| 2002/0054443 | A1 * | 5/2002 | Seng | G11B 20/10009 360/32 |
| 2002/0087910 | A1 * | 7/2002 | McEwen | G11B 20/1403 |
| 2003/0137765 | A1 * | 7/2003 | Yamazaki | G11B 20/18 |
| 2003/0147168 | A1 * | 8/2003 | Galbraith | G11B 20/10009 360/53 |
| 2007/0081266 | A1 * | 4/2007 | Buch | G11B 20/1403 |
| 2007/0110188 | A1 * | 5/2007 | Esumi | H03M 13/6343 375/324 |
| 2011/0002211 | A1 * | 1/2011 | Ratnakar Aravind | G11B 20/10037 |
| 2011/0060973 | A1 * | 3/2011 | Yang | G11B 20/10527 711/E12.002 |
| 2012/0047396 | A1 * | 2/2012 | Garani | G06F 11/2094 714/E11.113 |
| 2012/0084336 | A1 * | 4/2012 | Yang | G11B 20/10046 708/323 |
| 2012/0182643 | A1 * | 7/2012 | Zhang | G11B 20/14 360/77.02 |

* cited by examiner

*Primary Examiner* — Peter Vincent Agustin

(57) ABSTRACT

A method of reading data from a rotating magnetic storage medium, having at least one read head, includes storing respective digitized data samples from each respective read head of the at least one read head in a respective timing buffer, determining a zero-phase start phase angle from a preamble of the digitized data samples, feeding forward the zero-phase start phase angle to an interpolator, selecting an interpolation filter based on the fed-forward zero-phase start phase angle, releasing the respective digitized data from the respective timing buffer after a duration sufficient for completion of the determining, the feeding forward and the selecting, and interpolating samples of the digitized data released from the respective timing buffer.

37 Claims, 12 Drawing Sheets

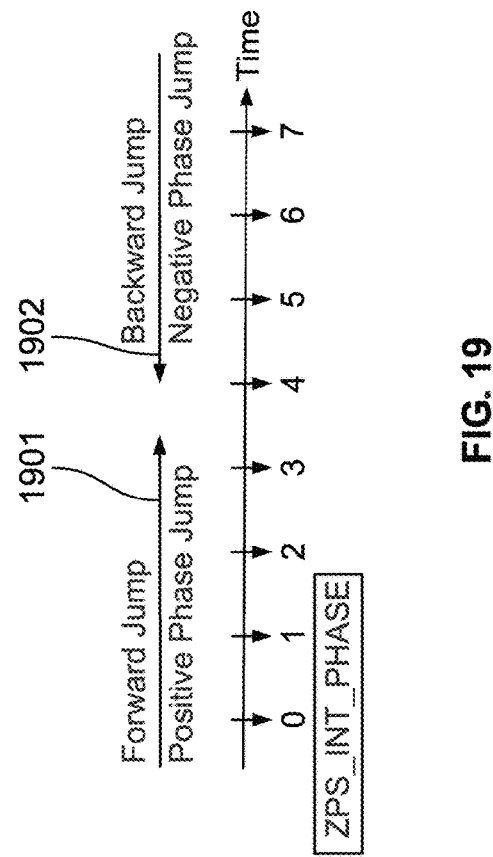
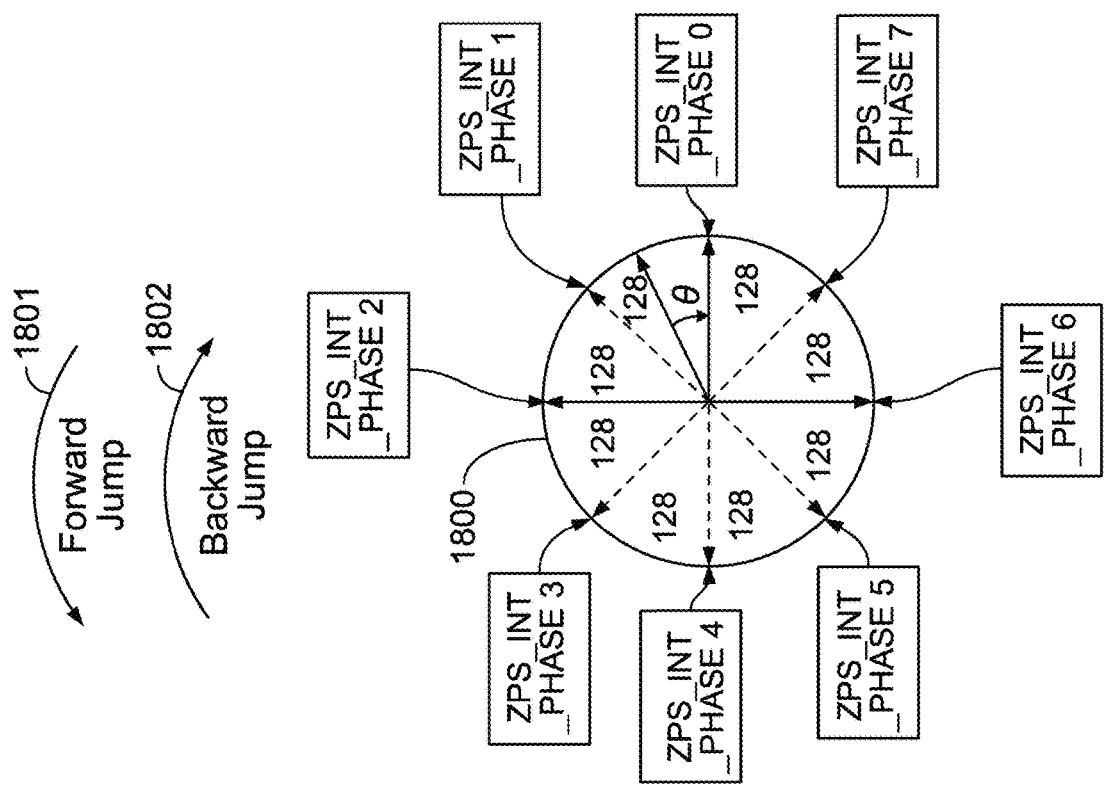
FIG. 18
FIG. 19

| Index (i) | $\theta_i$ | | | $LUT_i=(\theta_i \cdot 128)/\pi$ |
|---|---|---|---|---|
| | $\tan^{-1}(2^{-i})$ | rad | degree | |
| 1 | $\tan^{-1}(2^{-1})$ | 0.463647609 | 26.56505117 | 18.8750 |
| 2 | $\tan^{-1}(2^{-2})$ | 0.244978663 | 14.03624346 | 10.0000 |
| 3 | $\tan^{-1}(2^{-3})$ | 0.124354994 | 7.125016348 | 5.0625 |
| 4 | $\tan^{-1}(2^{-4})$ | 0.062418809 | 3.576334374 | 2.5625 |
| 5 | $\tan^{-1}(2^{-5})$ | 0.031239833 | 1.789910608 | 1.2500 |
| 6 | $\tan^{-1}(2^{-6})$ | 0.015623728 | 0.895173710 | 0.6250 |
| 7 | $\tan^{-1}(2^{-7})$ | 0.007812341 | 0.447614170 | 0.3125 |
| 8 | $\tan^{-1}(2^{-8})$ | 0.003906230 | 0.223810500 | 0.1875 |
| 9 | $\tan^{-1}(2^{-9})$ | 0.001953122 | 0.111905677 | 0.0625 |

DIGITAL TIMING RECOVERY IN HARD DISK DRIVE READ CHANNEL FOR PREAMBLE REDUCTION

CROSS REFERENCE TO RELATED APPLICATIONS

This disclosure claims the benefit of copending, commonly-assigned United States Provisional Patent Applications Nos. 63/449,933 and 63/451,204, filed Mar. 3, 2023 and Mar. 9, 2023, respectively, each of which is hereby incorporated by reference herein in its respective entirety.

FIELD OF USE

This disclosure relates to digital timing recovery for use in the read channel of a hard disk drive. More particularly, this disclosure relates to increasing the area available for user data on a hard disk drive by reducing the latency of digital timing recovery, thereby reducing the amount of disk area devoted to preamble data.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

In magnetic recording, as one example, reading and writing are performed by one or more heads that move relative to the surface of a storage medium. Many magnetic disk drives, for example, include a plurality of individual disks, or "platters," which may be two-sided—i.e., each platter can store data on each of its two sides. Therefore, such a disk drive would have at least two heads for each platter. Indeed, for each platter, there is normally at least one write head and at least one separate read head, so that such a disk drive normally has at least four heads per platter.

In a common configuration, all of the heads in a given disk drive are mounted on arms attached to a common actuator that controls the radial position of the heads (an angular, tangential or circumferential component of motion is provided by the rotation of the platters relative to the heads). This is true whether there is one or many platters, and one or multiple heads per platter.

When writing user data to a hard disk drive, a preamble followed by user data is written first. When reading the data, a clock has to be recovered from the data that is read, and the preamble must be long enough for clock recovery to occur while the preamble is being read. However, the longer the preamble, the more disk space is occupied by preamble data, leaving less space for user data.

SUMMARY

In accordance with implementations of the subject matter of this disclosure, a method of reading data from a rotating magnetic storage medium having at least one read head includes storing respective digitized data samples from each respective read head of the at least one read head in a respective timing buffer, determining a zero-phase start phase angle from a preamble of the digitized data samples, feeding forward the zero-phase start phase angle to an interpolator, selecting an interpolation filter based on the fed-forward zero-phase start phase angle, releasing the respective digitized data from the respective timing buffer after a duration sufficient for completion of the determining, the feeding forward and the selecting, and interpolating samples of the digitized data released from the respective timing buffer.

A first implementation of such a method may further include, where analog signals from each read head of the at least one read head are digitized at a clock rate that is oversampled relative to a bit rate of the data, phase-rotating the digitized data prior to the determining, to account for the oversampled clock, where the releasing occurs after a duration sufficient for completion of the phase-rotating, the determining, the feeding forward and the selecting.

A second implementation of such a method may further include, when the at least one read head comprises more than one read head, delaying signals from at least one of the at least one read head to align the signals before the storing.

A third implementation of such a method may further include equalizing the interpolated samples, detecting data bits from the interpolated samples, detecting timing error between the interpolated samples and the data bits, and deriving a bit rate from the timing error, where selecting the interpolation filter is based also on the bit rate.

Where analog signals from each read head of the at least one read head are digitized at a clock rate that is oversampled relative to a bit rate of the data, a first aspect of that third implementation may further include, prior to equalization, storing the interpolated samples in a FIFO buffer based on the oversampled clock, and reading the interpolated samples from the FIFO buffer at the bit rate.

In a fourth implementation of such a method, determining a zero-phase start phase angle from the preamble of the digitized data may include performing a Discrete Fourier Transform operation on the preamble of the digitized data, deriving cosine values and sine values from the Discrete Fourier Transform operation, and performing a CORDIC operation on the cosine values and the sine values to derive the zero-phase start phase angle.

According to a first aspect of that fourth implementation, performing the CORDIC operation may include performing a number of CORDIC rotations determined by a desired precision.

According to a second aspect of that fourth implementation, deriving the cosine values and the sine values from the Discrete Fourier Transform operation may include applying cosine coefficients from the Discrete Fourier Transform to each of the digitized data samples and accumulating the cosine values, and applying sine coefficients from the Discrete Fourier Transform to each of the digitized data samples and accumulating the sine values.

In a first instance of that second aspect, accumulating the cosine values and accumulating the sine values vary according to a tone of the preamble.

A third aspect of that fourth implementation may further include converting the zero-phase start phase angle to a phase jump.

In a first instance of that third aspect, converting the zero-phase start phase angle to a phase jump may include looking up a phase jump value in a look-up table.

A second instance of that third aspect may further include correcting the phase jump to account for the oversampling.

In a first variation of that second instance, correcting the phase jump to account for the oversampling may include correcting an integer portion of the zero-phase start phase angle in an angle domain, and correcting a fractional portion of the zero-phase start phase angle in a phase domain.

In accordance with implementations of the subject matter of this disclosure, a storage device includes a rotating storage medium on which data is written, at least one read head, a respective timing buffer configured to store respective digitized data samples from each respective read head of the at least one read head, zero-phase start circuitry configured to determine a zero-phase start phase angle from a preamble of the digitized data samples, and interpolator circuitry, output of the zero-phase start circuitry being fed forward to the interpolator circuitry, the interpolator circuitry including an interpolation filter configured to be selected based on the fed-forward zero-phase start phase angle. The respective digitized data is released from the respective timing buffer after a duration sufficient for completion of operation of the zero-phase start circuitry and the interpolator circuitry, and the interpolator circuitry is configured to interpolate samples of the digitized data released from the respective timing buffer.

A first implementation of such a storage device may further include a respective analog-to-digital converter configured to digitize analog signals from a respective read head of the at least one read head, each respective analog-to-digital converter clocked by a clock that is oversampled relative to a bit rate of the data, and phase-rotation circuitry configured to phase-rotate the digitized data prior to input to the zero-phase start circuitry, to account for the oversampled clock, where the duration may further be sufficient to account for completion of the phase-rotating.

In a second implementation of such a storage device, the at least one read head may include more than one read head, and the storage device may further include delay circuitry configured to delay signals from at least one of the at least one read head to align the signals before storage in the respective timing buffers.

A third implementation of such a storage device may further include equalization circuitry configured to filter the interpolated samples, a data detector configured to detect data bits from the interpolated samples, error-detecting circuitry configured to detect timing error between the interpolated samples and the data bits, and a timing loop configured to derive a bit rate from the timing error, where the interpolator circuitry is configured to select an interpolation filter based on the bit rate.

A first aspect of that third implementation may further include a respective analog-to-digital converter configured to digitize analog signals from a respective read head of the at least one read head, each respective analog-to-digital converter clocked by a clock that is oversampled relative to a bit rate of the data, and a FIFO buffer configured to store the interpolated samples based on the oversampled clock, and to output the interpolated samples at the bit rate.

In a fourth implementation of such a storage device, the zero-phase start circuitry may include Discrete Fourier Transform circuitry configured to operate on the preamble of the digitized data, cosine accumulator circuitry configured to derive cosine values from output of the Discrete Fourier Transform circuitry, sine accumulator circuitry configured to derive sine values from output of the Discrete Fourier Transform circuitry, and CORDIC circuitry configured to operate on the cosine values and the sine values to derive the zero-phase start phase angle.

According to a first aspect of that fourth implementation, the CORDIC circuitry may be configured to perform a number of CORDIC rotations determined by a desired precision.

According to a second aspect of that fourth implementation, the cosine accumulator circuitry and the sine accumulator circuitry may vary according to a tone of the preamble.

A third aspect of that fourth implementation may further include circuitry configured to convert the zero-phase start phase angle to a phase jump.

In a first instance of that third aspect, the circuitry configured to convert the zero-phase start phase angle to a phase jump may include a look-up table.

A second instance of that third aspect may further include circuitry configured to correct the phase jump to account for the oversampling.

In a first variation of that second instance, the circuitry configured to correct the phase jump to account for the oversampling may be configured to correct an integer portion of the zero-phase start phase angle in an angle domain, and to correct a fractional portion of the zero-phase start phase angle in a phase domain.

In accordance with implementations of the subject matter of this disclosure a storage device includes rotating storage means on which data is written, at least one read head means, respective timing buffer means configured to store respective digitized data samples from each respective read head means of the at least one read head means, zero-phase start means configured to determine a zero-phase start phase angle from a preamble of the digitized data samples, and interpolator means, output of the zero-phase start circuitry means being fed forward to the interpolator means, the interpolator means including interpolation filter means configured to be selected based on the fed-forward zero-phase start phase angle. The respective digitized data is released from the respective timing buffer means after a duration sufficient for completion of operation of the zero-phase start means and the interpolator means, and the interpolator means is configured to interpolate samples of the digitized data released from the respective timing buffer means.

A first implementation of such a storage device may further include a respective analog-to-digital converter means configured to digitize analog signals from a respective read head means of the at least one read head means, each respective analog-to-digital converter means clocked by clock means that is oversampled relative to a bit rate of the data, and phase-rotation means configured to phase-rotate the digitized data prior to input to the zero-phase start means, to account for the oversampled clock, where the duration further be sufficient to account for completion of the phase-rotating.

In a second implementation of such a storage device, the at least one read head means may include more than one read head means, and the storage device may further include delay means configured to delay signals from at least one of the at least one read head means to align the signals before storage in the respective timing buffer means.

A third implementation of such a storage device may further include equalization means configured to filter the interpolated samples, data detector means configured to detect data bits from the interpolated samples, error-detecting means configured to detect timing error between the interpolated samples and the data bits, and timing loop means configured to derive a bit rate from the timing error, where the interpolator means is configured to select an interpolation filter based on the bit rate.

A first aspect of that third implementation may further include respective analog-to-digital converter means configured to digitize analog signals from a respective read head means of the at least one read head means, each respective analog-to-digital converter means clocked by a clock that is oversampled relative to a bit rate of the data, and FIFO buffer means configured to store the interpolated samples based on the oversampled clock, and to output the interpolated samples at the bit rate.

In a fourth implementation of such a storage device, the zero-phase start means may include Discrete Fourier Transform means configured to operate on the preamble of the digitized data, cosine accumulator means configured to derive cosine values from output of the Discrete Fourier Transform means, sine accumulator means configured to derive sine values from output of the Discrete Fourier Transform means, and CORDIC means configured to operate on the cosine values and the sine values to derive the zero-phase start phase angle.

According to a first aspect of that fourth implementation, the CORDIC means may be configured to perform a number of CORDIC rotations determined by a desired precision.

According to a second aspect of that fourth implementation, the cosine accumulator means and the sine accumulator means may vary according to a tone of the preamble.

A third aspect of that fourth implementation may further include means configured to convert the zero-phase start phase angle to a phase jump.

In a first instance of that third aspect, the means configured to convert the zero-phase start phase angle to a phase jump may include look-up table means.

A second instance of that third aspect may further include means configured to correct the phase jump to account for the oversampling.

In a first variation of that second instance, the means configured to correct the phase jump to account for the oversampling may be configured to correct an integer portion of the zero-phase start phase angle in an angle domain, and to correct a fractional portion of the zero-phase start phase angle in a phase domain.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which:

FIG. 18 is a graphical illustration of a representation of a phase jump as a CORDIC angle, for a 4T preamble;

FIG. 19 is a graphical illustration of phase jump, including direction, as a function of CORDIC angle, for a 4T preamble;

DETAILED DESCRIPTION

Figure 1:
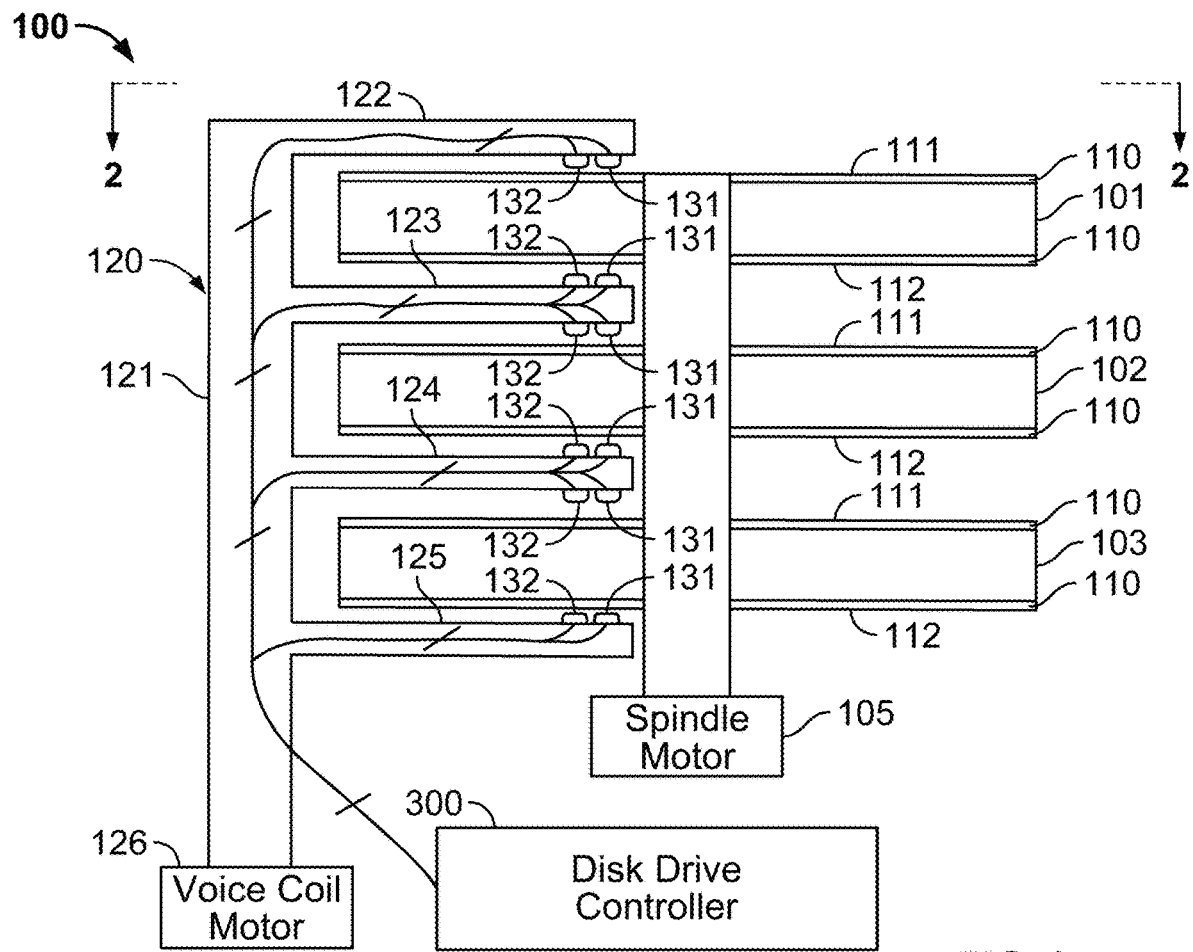
FIGS. 1 and 2 show an example of a disk drive 100 with which the subject matter of the present disclosure may be used.
Figure 2:
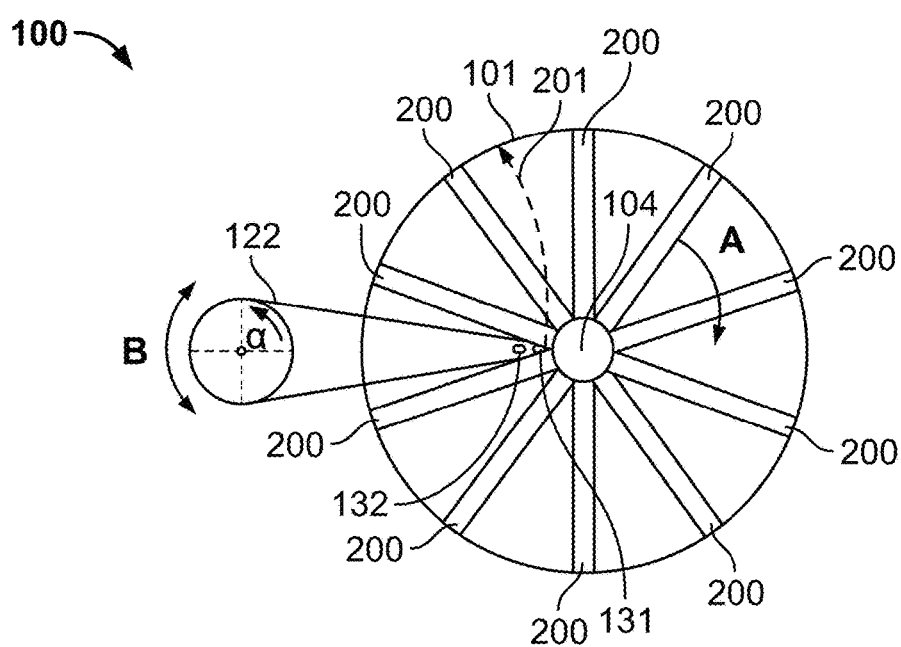

FIGS. 1 and 2 show an example of a disk drive 100 with which the subject matter of the present disclosure may be used. In this particular example, disk drive 100 has three platters 101, 102, 103, although any number of platters may be included in a disk drive with which the subject matter of the present disclosure may be used. As shown, each platter 101, 102, 103 has, on each of its upper and lower surfaces 111, 112, a coating 110 made from a material in which data can be stored, e.g., magnetically. The present disclosure also is relevant to a disk drive in which one or more platters includes coating 110 on only one of its surfaces, but such a disk drive would store less data in the same volume than a disk drive with two-sided platters. The platters 101-103 are mounted on a rotatable spindle 104. Spindle motor 105 rotates spindle 104 to rotate platters 101-103 in the direction of arrow A (FIG. 2). Although spindle motor 105 is shown connected directly to spindle 104, in some cases spindle motor 105 may be located off-axis of spindle 104 and would be connected to spindle 104 through belts or gears (not shown).

Read/write head assembly 120 includes an actuator 121 that bears arms 122-125, one of which is disposed adjacent to each surface 111, 112 of a platter 101, 102, 103 that has a memory storage coating 110. In this example, with heads on both surfaces of each of arms 123, 124, that amounts to four arms 122-125, but in the single-sided platter example discussed above, there would be only three arms. In other examples, the number of arms would increase or decrease along with the number of platters.

Each arm 122-125 bears, at or near its end furthest from actuator 121, and on both its upper and lower surfaces in the case of arms 123, 124, a plurality of read heads/sensors and write heads. In this case, two sensors 131, 132 are shown, and may represent, respectively, read and write sensors, although it in some applications each arm 123, 124 may bear more than one read head/sensor and more than one write head (not shown). In the configuration shown in FIGS. 1 and 2, arms 122-125 are aligned along a radius of platters 101-103, bringing heads 131, 132 as close as they can get to spindle 104. It should be noted that FIGS. 1 and 2 are schematic only and not to scale. Normally, the spindle diameter would be larger relative to the disk diameter. Moreover, arms 122-125 normally cannot point directly at the center of the disk.

Figure 3:
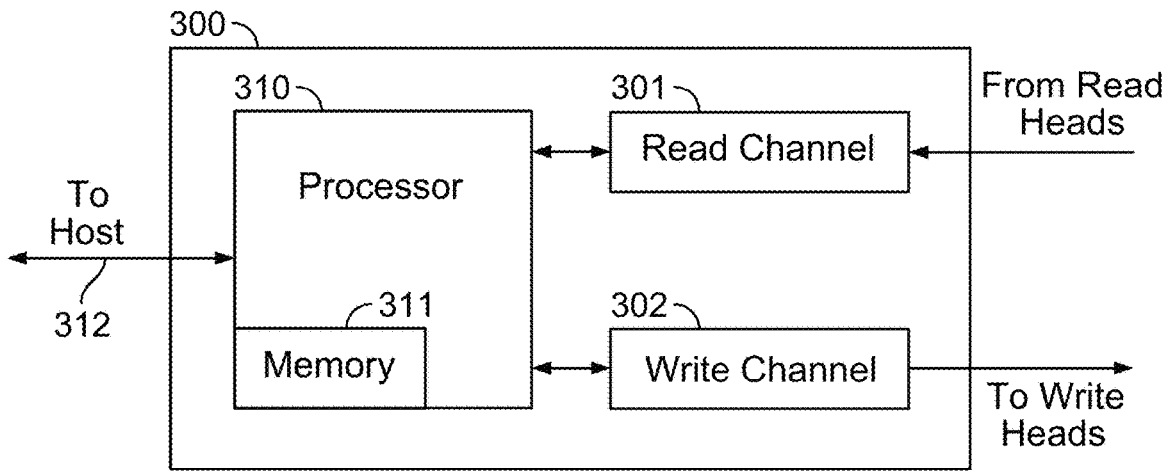
FIG. 3 is a diagram of a hard drive controller that may be used in a disk drive as in FIGS. 1 and 2 in implementations of the subject matter of this disclosure.

Each of read heads 131, 132 is connected to a read channel 301 of a hard drive controller 300 (there is a corresponding write channel 302) (FIG. 3). Hard drive controller 300 also includes a processor 310 and memory 311, as well as a connection 312 to a host processor (not shown).

As noted above, when writing user data to a hard disk drive, a preamble followed by user data is written first. When reading the data, a clock has to be recovered from the data that is read, and the preamble must be long enough for clock recovery to occur while the preamble is being read. However, the longer the preamble, the more disk space is occupied by preamble data, leaving less space for user data. Therefore, if clock or timing recovery is too slow, a longer preamble is required, reducing the disk space available for user data and lowering the storage efficiency of the disk drive. It would be desirable to shorten the preamble to increase the disk space available for user data.

The signal from a disk drive read head originates as an analog signal, which is digitized for further processing. An analog-to-digital converter (ADC) for digitizing the data is necessarily clocked. In typical analog timing recovery techniques, information is fed back from the digital domain to an analog clock source—e.g., a phase-locked loop (PLL)—that clocks the ADC. The feedback loop typically introduces substantial latency based on, e.g., the latency of zero-phase start circuitry, which adjusts the sampling phase, as well as the latency of timing accumulator circuitry. If the disk drive uses two heads, as in two-dimensional magnetic recording (TDMR) implementations, additional latency is introduced by any buffering needed to account for the distance between read heads.

However, in accordance with implementations of the subject matter of this disclosure, a digital timing recovery technique is provided which eliminates the effects of latency of zero-phase start operations and associated timing accumulation operations. In implementations of this technique, the analog timing is completely separated from the digital timing. The ADC in the analog domain, which digitizes the read-head signals, is clocked by a free-running clock (which may be provided, e.g., by a PLL). There is no feedback to that clock from the digital domain. However, in order to assure that the ADC conversion is not undersampled, the analog clock is deliberately oversampled so that is it certain to be no slower than the target clock to be recovered in the digital domain. Any effects of the oversampling are removed later in the digital timing recovery processing.

Unlike analog timing recovery, where portions of the clock recovery processing must be completed during the time it takes to read the preamble signal from the storage medium, which necessitates lengthening the preamble to account for that clock recovery processing time, and thereby increase the storage capacity occupied by the preamble, in digital timing recovery, the signal read from the storage medium can simply be held in a buffer until those portions of the clock recovery processing are complete. Therefore, the preamble length is decoupled from the clock recovery processing time, and the preamble needs to be only as long as is necessary to support clock recovery processing as described below. While that does not reduce the time necessary for the processing (except for the differences between analog and digital processing), it reduces the amount of storage medium space needed for the preamble, improving storage medium efficiency.

The digitized data from the read head or heads is buffered while zero-phase start operations are performed to determine a starting phase and magnitude which are fed forward (instead of being fed back as in analog timing recovery) to interpolation operations to recover the clock. If two or more heads are used, a delay or delays are used to align the respective signals from the different heads before buffering. The aligned signals are then buffered and also processed through phase rotation to remove the effects of oversampling (as discussed above), because zero-phase start operation will not function correctly on the oversampled signals. Effectively, the phase rotation is equivalent to downsampling the signals back to their original sampling rate.

The zero-phase start operation begins with a Discrete Fourier Transform (DFT) operation on the preamble data, to derive sine and cosine coefficients, which are accumulated to provide inputs to a CORDIC operation that determines the ZPS phase angle, which is converted into a sampling time adjustment, as described below. The preamble may be a 2T, 3T or 4T tone, requiring different CORDIC resolution. The number of CORDIC iterations may be selected for the highest required resolution. For example, ten iterations may provide the required resolution for the 4T case, without imposing a significant burden on the 2T or 3T case, even though fewer iterations may be sufficient in those cases. Once the ZPS angle has been determined, it may be converted to a ZPS time jump (i.e., sampling time adjustment) using, e.g., a single look-up table whose values may be multiplied by 2, 3 or 4, respectively, for a 2T, 3T or 4T preamble. A further correction may be implied taking into account the oversampling factor. Further adjustments or corrections may be applied by the user—in either the oversampled domain or the downsampled domain or both—to account for, e.g., constant errors due to media defects.

Implementations of the subject matter of this disclosure may be better understood by reference to FIGS. 4-20.

Figure 4:
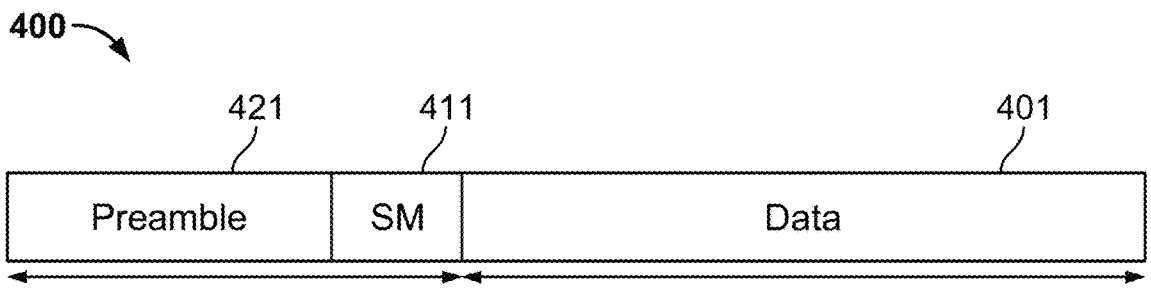
FIG. 4 is a is a representation of a data packet to be read from a hard disk drive.
Figure 5:
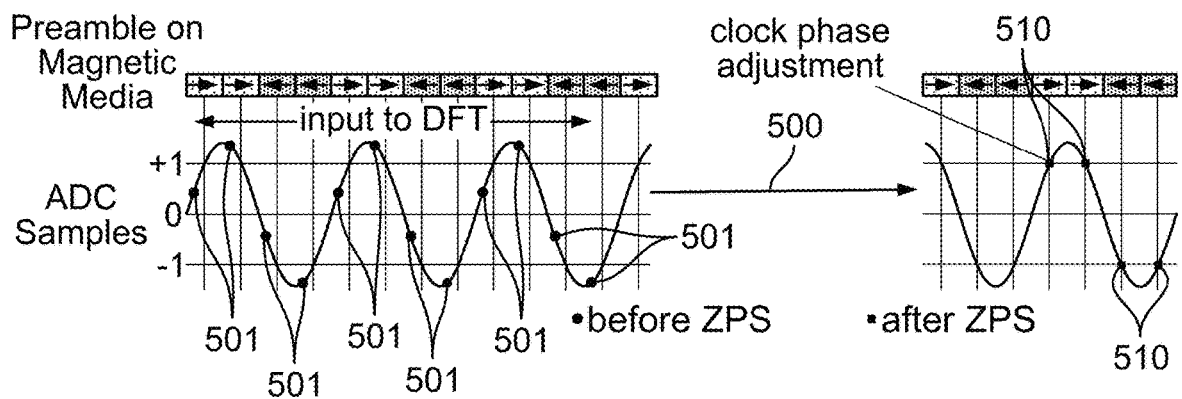
FIG. 5 is a graphical representation of the effect of a clock phase adjustment by zero-phase start on preamble data samples.

The nature of the problem to be solved may be appreciated from FIG. 4, which is a representation of a data packet 400 to be read from a hard disk drive. In addition to the actual user data payload 401, data packet 400 includes a sync mark 411 to aid in locating packet 400, and a preamble 421 from which zero-phase start circuitry may determine the starting phase. As seen in FIG. 5, before the ZPS operation 500, ADC samples 501 occur at seemingly random times during the clock cycle. ZPS operation 500 runs the initial bits of the preamble through a Discrete Fourier Transform (DFT) operation, to derive a phase adjustment after which ADC samples 510 are regularly distributed relative to the clock. The preamble needs to be only long enough to provide sufficient data for the DFT operation to derive the phase adjustment.

Figure 6:
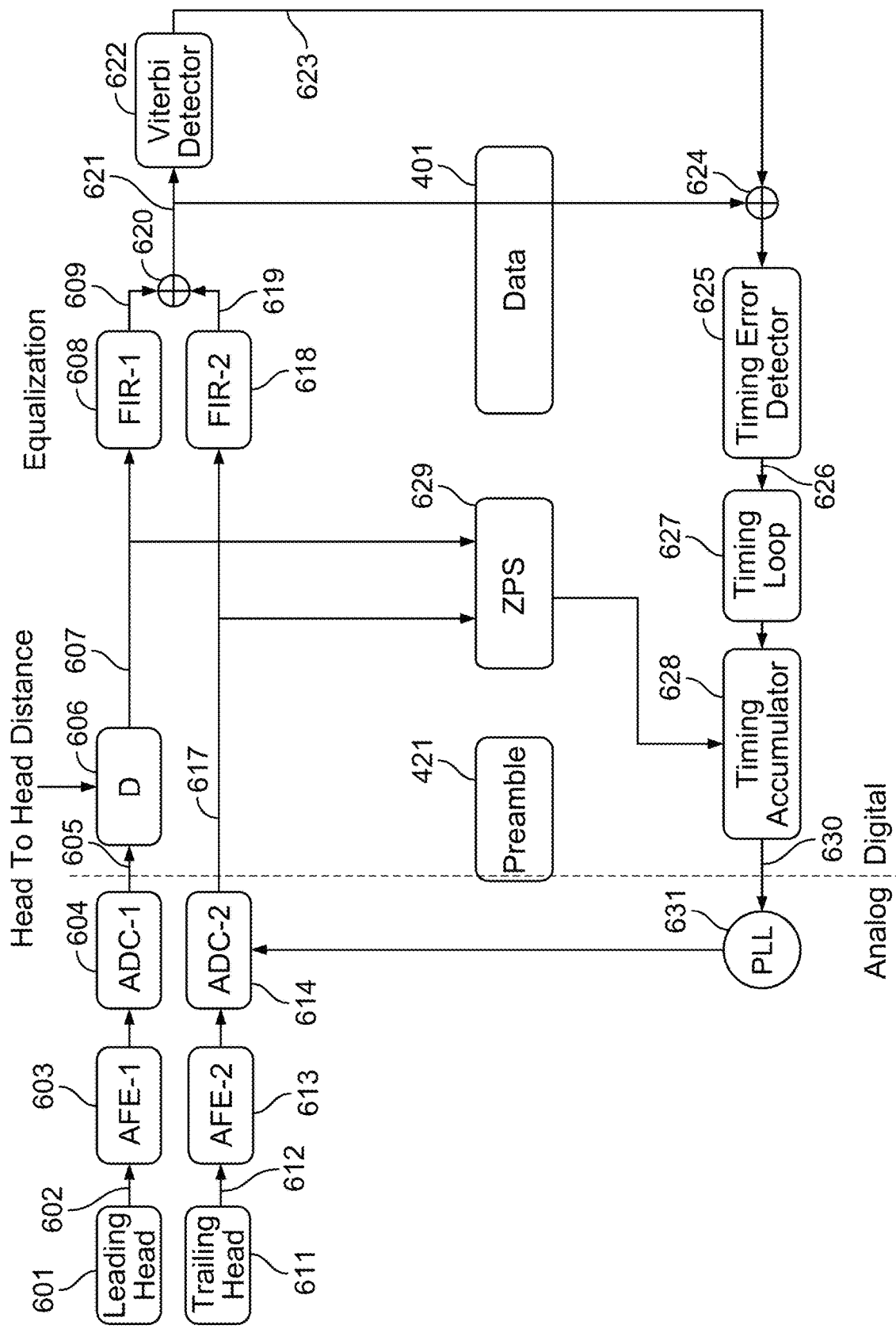
FIG. 6 is a schematic representation of a known two-head read channel circuit configured for analog timing recovery.

In a typical two-head read channel circuit 600 configured for analog timing recovery, shown in FIG. 6, signal 602 from leading read head 601 is processed through analog front end AFE-1 (603) and then is digitized at analog-to-digital converter ADC-1 (604). Signal 612 from trailing read head 611 is processed through analog front end AFE-2 (613) and then is digitized at analog-to-digital converter ADC-2 (614). Digitized leading-head signal 605 is delayed at 606 so that digitized trailing-head signal 617 can catch up and the two signals 607, 617 are aligned.

Aligned signals 607, 617 are equalized in finite impulse response filters FIR-1 (608) and FIR-2 (618) and the equalized signals 609, 619 are combined at 620. The combined signal 621 passes through a Viterbi detector 622 to derive user data 401. The output 623 of Viterbi detector 622 is compared at 624 to signal 621 to yield a timing error signal 626 detected by timing error detector 625. Timing error signal 626 passes through timing loop 627 and is combined in timing accumulator 628 with the phase correction determined by ZPS circuitry 629 from signals 607, 617. The output of timing accumulator 628 is a phase correction signal 630 that adjusts the phase of phase-locked loop (PLL) circuit 631 which controls the sampling timing of ADC-1 (604) and ADC-2 (614).

In such a typical analog timing recovery architecture, preamble 421 must be long enough to allow operations in ZPS circuitry 629 and timing accumulator 628, as well as the phase jump at PLL 631, to occur, as well as to account for head-to-head distance delay 606. As discussed above, lengthening the preamble 421 to account for these delays increases the amount of storage medium capacity devoted to the preamble, thereby reducing the amount of storage medium capacity available for user data 401.

Figure 7:
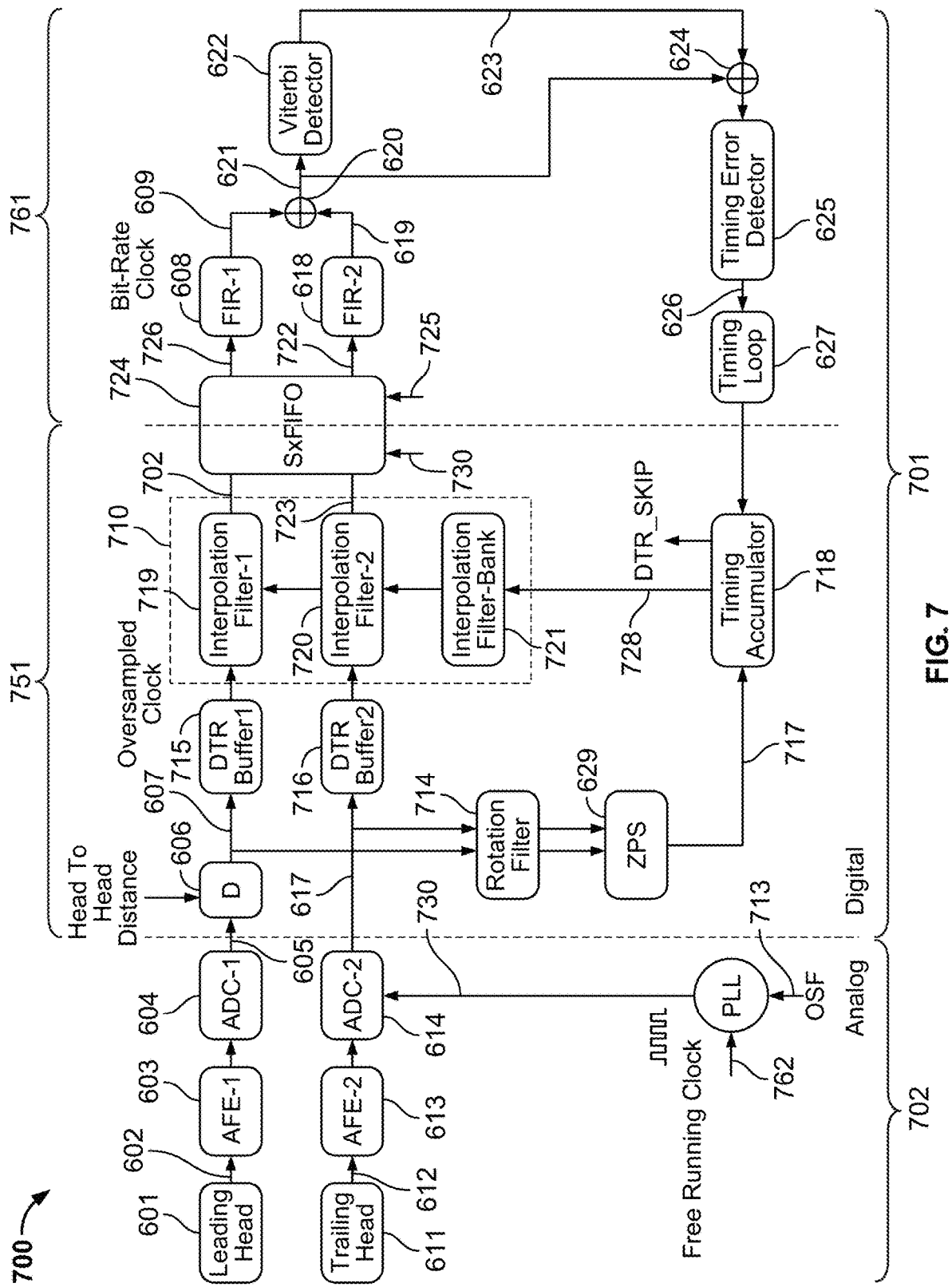
FIG. 7 is a schematic representation of a two-head read channel circuit configured for digital timing recovery in accordance with implementations of the subject matter of this disclosure.

As shown in FIG. 7, in accordance with implementations of the subject matter of this disclosure, feedback from ZPS circuitry 629 is eliminated from two-head read channel circuit 700 configured for digital timing recovery. Instead of being fed back, the output of ZPS circuitry 629 is fed forward, to interpolation circuitry 710 that adjusts the clock phase as described below. There is no feedback from the digital clock domain 701 to the analog clock domain 702. Accordingly, to ensure that the analog sampling clock 730, which is not adjusted based on feedback, that clocks ADCs 604, 614 is not too slow, PLL 711, which has a free-running reference clock input 712, is overclocked by oversampling factor (OSF) 713. The digital clock domain 701 is thus divided into an oversampled clock subdomain 751 upstream of interpolation circuitry 710, and a bit-rate clock subdomain 761 downstream of interpolation circuitry 710.

ZPS circuitry 629 will not operate correctly on an oversampled clock. Therefore, digital timing recovery circuitry 700 includes a rotation filter 714, upstream of ZPS circuitry 629, to filter out the effect of OSF 713. Like analog timing recovery circuitry 600, digital timing recovery circuitry 700 includes delay 606 in the path from leading read-head 601 to align the signals from leading read-head 601 to the signals from trailing read-head 611. However, because digital timing recovery circuitry 700 is digital, the aligned delayed signals 607, 617 need not be processed in real time. Instead, aligned delayed signals 607, 617 can be buffered as long as necessary in separate buffers—DTR Buffer-1 (715) and DTR Buffer-2 (716)—for the signals from leading read-head 601 and the signals from trailing read-head 611, respectively, until rotation operations in rotation filter 714, and ZPS operations in ZPS circuitry 629 can be completed and the ZPS output 717 can be processed through timing accumulator 718.

Interpolation circuitry 710 may include separate interpolation filters—Interpolation Filter-1 (719) and Interpolation Filter-2 (720)—for the signals from leading read-head 601 and the signals from trailing read-head 611, respectively, as well as an interpolation bank 721 which may select from among predetermined sets of coefficients for interpolation filters 719, 720 based on ZPS output 717 as processed through timing accumulator 718.

Interpolated data signals 722, 723 from interpolation filters 719, 720 are clocked into first-in-first-out (FIFO) circuit 724 based on oversampled clock 730 but are clocked out of FIFO circuit 724 based on bit-rate clock 725. FIFO output signals 726, 727 are equalized in finite impulse response filters FIR-1 (608) and FIR-2 (618) and the equalized signals 609, 619 are combined at 620. The combined signal 621 passes through a Viterbi detector 622 to derive user data 401. The output 623 of Viterbi detector 622 is compared at 624 to signal 621 to yield a timing error signal 626 detected by timing error detector 625. Timing error signal 626 passes through timing loop 627 and is combined in timing accumulator 718 with the phase correction 717 determined by ZPS circuitry 629, providing selection signal 728 for interpolation bank 721 to select from among predetermined sets of coefficients for interpolation filters 719, 720 as discussed above.

Selection signal 728 may represent a phase shift of the oversampled signal relative to the desired phase, determined as follows:

```
if (PHASE_SHIFT<0)
    NEXT_PHASE_SHIFT=PHASE_SHIFT+1.0
else
    NEXT_PHASE_SHIFT=PHASE_SHIFT-(OSF+phase_error)
if (NEXT_PHASE_SHIFT<0)
    SKIP_CLOCK=1
else
    SKIP_CLOCK=0
```

That is, if the current phase shift (i.e., the phase of an interpolated sample relative to the desired phase) is negative, then the phase shift is increased by one clock period to make the phase shift positive. Otherwise, if the current phase shift is positive, the phase shift is decreased by the sum of the OSF and the measured phase error. And if the phase shift as so adjusted is still negative, then the phase skips forward one period.

Although digital timing recovery circuitry 700 is shown as accommodating two heads, digital timing recovery circuitry in accordance with implementations of this disclosure may work with only one head, or with three (or more) heads. In a one-head implementation, one of DTR Buffer-1 (715) and DTR Buffer-2 (716) and one of Interpolation Filter-1 (719) and Interpolation Filter-2 (720) may be omitted, or forced to zero, and rotation filter 714 and ZPS circuitry 629 may operate with a single input. Additional circuitry may be provided if there are additional heads.

As noted above, implementations of this disclosure are intended to minimize the length of the preamble to maximize the amount of space available for user data. Accordingly, using techniques in accordance with implementations of this disclosure may not speed up performance of the various calculations required (phase rotation, zero-phase start, etc.). Rather, because the digital data from the read head or heads may be held in the DTR buffer or buffers as long as is necessary for those calculations to be performed (which in some cases may actually increase the overall time required), the size of the preamble, and therefore the storage space for the preamble, is determined simply by the length of the Discrete Fourier Transform of the preamble tone, which may be a 2T tone, a 3T tone or a 4T tone.

Figure 8:
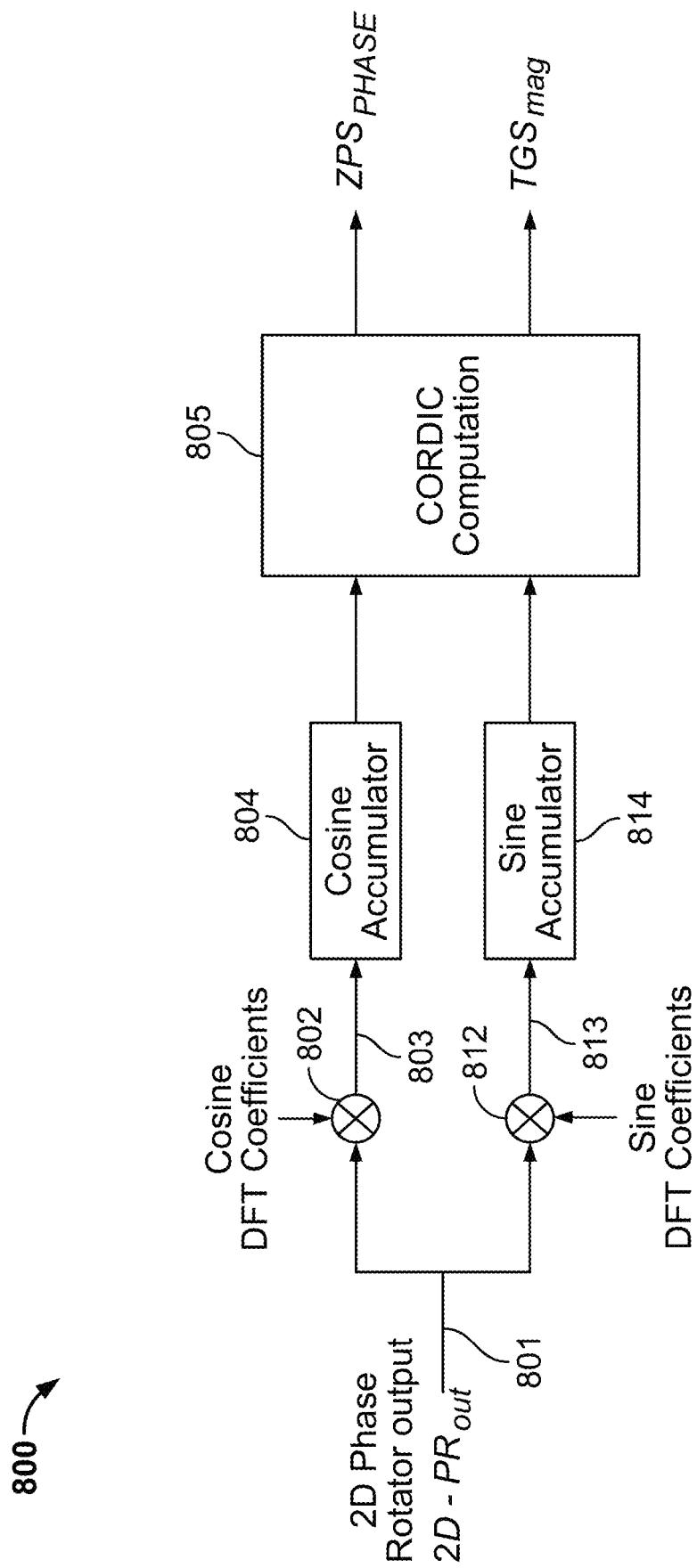
FIG. 8 is a representation of cosine and sine Discrete Fourier Transform accumulators, and a CORDIC arrangement, for determining a zero-phase start angle in accordance with implementations of the subject matter of this disclosure.

Although many implementations of ZPS circuitry 629 are possible, one implementation of ZPS circuitry 629 in accordance with this disclosure may operate using CORDIC (COordinate Rotation DIgital Computer) techniques to determine the starting phase angle (and the starting magnitude, which may optionally be fed forward for automatic gain control). One implementation of a CORDIC arrangement 800 for determining the ZPS angle is shown in FIG. 8. The output 801 of phase rotator 714 is multiplied at 802 and 812 by cosine coefficients and sine coefficients, respectively, from the Discrete Fourier Transform of the preamble tone. Details of the coefficients are discussed below. The products 803, 813 are accumulated in respective cosine and sine accumulators 804, 814, yielding x and y coordinates representing the ZPS angle on a unit circle. CORDIC computation circuitry 805 uses well-known CORDIC techniques, in which the (x,y) vector is rotated toward the x-axis in angular steps of $\tan^{-1}(2^{-n})$, where n=0, 1, 2, . . . . If any particular nth rotation overshoots the x-axis, the next rotation is in the opposite direction, until the vector is so close to the axis to be considered to have reached the x-axis, as discussed below. The signed sum of angular steps (where clockwise rotation is added and counterclockwise rotation is subtracted) is used as the ZPS phase angle, and may be converted to a phase jump in units of T.

The DFT coefficients to be applied at 802, 812 depend on whether the preamble is a 2T preamble, a 3T preamble or a 4T preamble.

For a 2T preamble, the cosine values of $\cos(2\pi n/4)$ and the sine values of $\sin(2\pi n/4)$ represent four positions around a unit circle at 0°, 90°, 180° and 270°. For the cosine values, those four positions correspond to coefficients n=[1,0,−1,0]. For the sine values, those four positions correspond to coefficients n=[0,−1,0,1].

For a 3T preamble, the cosine values of $\cos(2\pi n/6)$ and the sine values of $\sin(2\pi n/6)$ represent six positions around a unit circle at 0°, 60°, 120°, 180°, 240° and 300°. For the cosine values, those six positions correspond to coefficients n=[1,1/2,−1/2,−1,−1/2,1/2]=[2,1,−1,−2,−1,1]×1/2. For the sine values, those six positions correspond to coefficients n=[0,−√3/2,−√3/2,0,√3/2,√3/2]=[0,−1,−1,0,1,1]×√3/2.

For a 4T preamble, the cosine values of $\cos(2\pi n/8)$ and the sine values of $\sin(2\pi n/8)$ represent eight positions around a unit circle at 0°, 45°, 90°, 135°, 180°, 225°, 270° and 315°. For the cosine values, those eight positions correspond to coefficients n=[1,1/√2,0,−1/√2,−1,−1/√2,0,1/√2]= [1,0,0,0,−1,0,0,0,]+ [0,1,0,−1,0,−1,0,1]×1/√2. For the sine values, those eight positions correspond to coefficients n=[1,−1/√2,−1,−1/√2,0,1/√2,1,1/√2]= [0,0,−1,0,0,0,1,0]+ [0,−1,0,−1,0,1,0,1]×1/√2.

Figures 9, 10, 11:
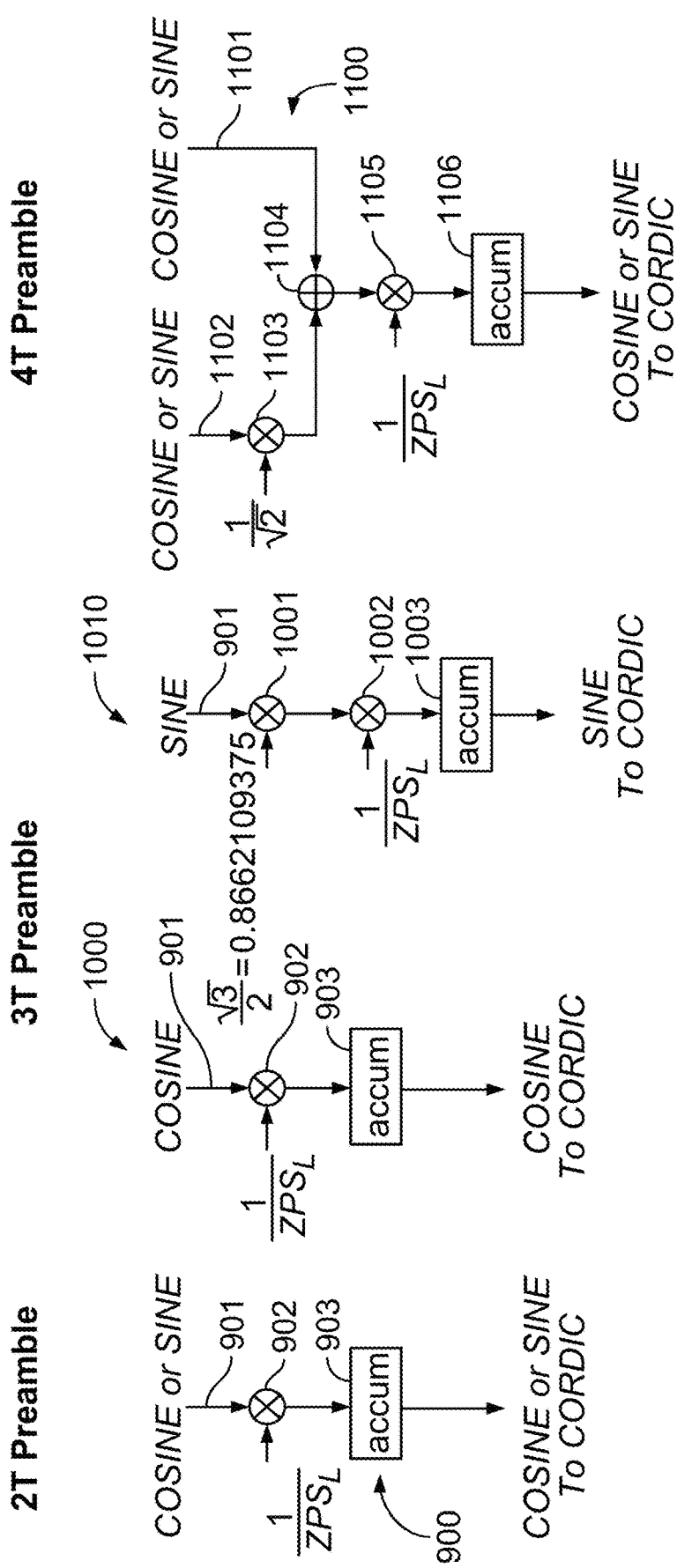
FIG. 9 is a representation of cosine and sine DFT accumulator averaging and rounding for a 2T preamble in accordance with implementations of the subject matter of this disclosure.
FIG. 10 is a representation of cosine and sine DFT accumulator averaging and rounding for a 3T preamble in accordance with implementations of the subject matter of this disclosure.
FIG. 11 is a representation of cosine and sine accumulator averaging and rounding for a 4T preamble in accordance with implementations of the subject matter of this disclosure.

FIG. 9 shows an implementation 900 of cosine and sine DFT coefficient generation for the 2T preamble case. For a 2T preamble, the cosine and sine accumulators 804, 814 are identical. The DFT coefficients, operating at 802 on the phase rotator output 801 provides a cosine or sine value 901 that is divided at 902 by the ZPS length, ZPS: (i.e., the number of samples at the output of the rotation filter 714 which are accumulated by the DFT, which is the number of preamble samples over which ZPS is computed), which could be as high as 48 as shown in following table:

| D_TL_ZPS_WIN | 2T | 3T | 4T |
|---|---|---|---|
| 0 | 0 | 0 | 0 |
| 1 | 8 | 12 | 8 |
| 2 | 16 | 18 | 16 |
| 3 | 24 | 24 | 24 |
| 4 | 32 | 30 | 32 |
| 5 | 36 | 36 | 40 |
| 6 | 48 | 48 | 48 |

The quotient is added at 903 to the previously accumulated values from previous coefficients.

FIG. 10 shows implementations 1000, 1010 of cosine DFT coefficient generator 804 and sine DFT coefficient generator 814 for the 3T preamble case. For a 3T preamble, the cosine and sine DFT coefficient computations are different. As seen, 3T cosine DFT coefficient generator 1000 is essentially the same as cosine DFT coefficient generator 900. In sine DFT coefficient generator 1010, the input 901 is multiplied at 1001 by √3/2 to reflect the coefficient values described above, and then is divided at 1002 by the ZPS length $ZPS_L$, as discussed above. The quotient is added at 1003 to the previously accumulated values from previous coefficients.

For a 4T preamble, as in the case of a 2T preamble, the cosine DFT coefficient generator 804 and the sine DFT coefficient generator 814 are the same, having the structure 1100 (FIG. 11). As described above, the coefficients in the 4T case are the sum of a first term equal to 0, +1 or −1, and a second term equal the product of (a) 0, +1 or −1, and (b) 1/√2. Therefore, DFT coefficient generator 1100 has first input 1101 and a second input 1102. Input 1102 is multiplied at 1103 by 1/√2, and that product is added at 1104 to first input 1101. That sum is divided at 1105 by the ZPS length, $ZPS_L$, as described above. The quotient is added at 1106 to the previously accumulated values from previous coefficients.

Figure 12:
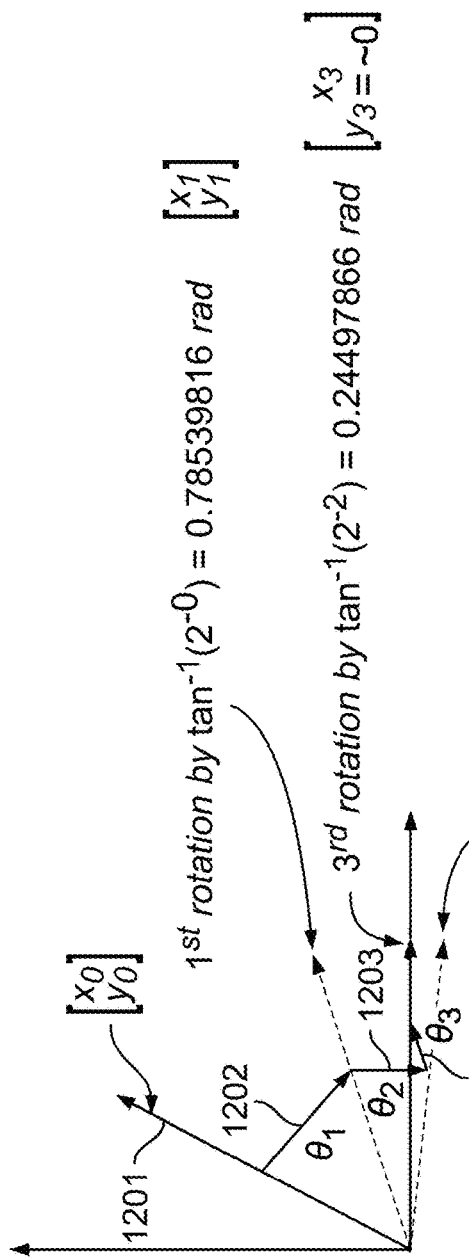
FIG. 12 is a graphical representation of an illustrative CORDIC operation.

As discussed above, the accumulated coefficients may be used in CORDIC circuitry 805 to determine a phase angle that allows the interpolation circuitry 710 to adjust the phase of the read head signals 607, 617. As illustrated in FIG. 12, CORDIC rotates input vector $(x_0, y_0)$ 1201, in each of i iterations by an angle $\theta_i = \tan^{-1}(2^{-(i-1)})$. The sign of $y_{i-1}$ determines the direction of rotation for $i^{th}$ iteration—if $y_{i-1}$ is positive (the rotated vector is above the x-axis), then the next rotation direction is clockwise and $\theta_i$ is positive; if $y_{i-1}$ is negative (the rotated vector is below the x-axis), then the next rotation direction is counterclockwise and $\theta_i$ is negative.

In the illustration in FIG. 12, after the first iteration 1202 with rotation $\theta_1 = \tan^{-1}(2^{-0}) = 45°$ or $\pi/4$ radians (with $\theta_1$ being positive and added in an accumulator), $y_1$ is positive (the rotated vector is above the x-axis), so the next angle 1203—i.e., $\theta_2 = \tan^{-1}(2^{-1}) = 26.57°$, or 0.4636 radians—will be positive (added in the accumulator), and the next rotation direction will be clockwise. After that second iteration, $y_2$ is negative (the rotated vector is now below the x-axis), so the next angle 1204—i.e., $\theta_3 = \tan^{-1}(2^{-2}) = 14.04°$, or 0.2445 radians—will be negative (subtracted in the accumulator), and the next rotation direction will be counterclockwise.

After sufficient number, n, of iterations, $y_n \approx 0$. The magnitude $x_n$ of the rotated vector will remain approximately equal to $\sqrt{(x^2+y^2)}$. The angle $\theta = \tan^{-1}(y_0/x_0)$ can be derived as $$\theta \approx \sum_{i=1}^{n} \theta_i = \sum_{i=1}^{n} d_{(i-1)} \tan^{-1}(2^{-(i-1)})$$

where $d_{(i-1)} \in \{+1,-1\} = \text{sign}(y_{(i-1)})$.

ZPS for a 2T, 3T, or 4T preamble requires a resolution of $(\pi/2)/128$, $(\pi/3)/128$, or $(\pi/4)/128$ radians, respectively. Therefore the best resolution is $(\pi/4)/128=0.006135923$ radians. Dividing by 2 to take the effects of rounding into account means a resolution of $0.006135923/2=0.00306796157$ radians is required. At the $n^{th}$ iteration, CORDIC has a resolution of $\theta_n=\tan^{-1}(2^{-(n-1)})$. The smallest n for which $\theta_n<0.00306796157$ radians is n=10 (because $\tan^{-1}(2^{-9})=0.001953125$, but $\tan^{-1}(2^{-8})=0.00390625$). Therefore, ten CORDIC iterations are required to achieve the desired resolution in such an implementation. The first rotation (i=1) of 45° is trivial, and so circuitry is needed only for nine iterations.

To rotate each vector $$\begin{bmatrix} x_{i-1} \\ y_{i-1} \end{bmatrix}$$

by the angle $\theta_i=\tan^{-1}(2^{-(i-1)})$ in the $i^{th}$ iteration, one can use a rotation matrix $R_i$:

$$R_i = \frac{1}{\sqrt{1+\tan^2(\theta_i)}} \begin{bmatrix} 1 & \tan(\theta_i) \\ -\tan(\theta_i) & 1 \end{bmatrix}$$

such that $$\begin{bmatrix} x_i \\ y_i \end{bmatrix} = R_i \cdot \begin{bmatrix} x_{i-1} \\ y_{i-1} \end{bmatrix}$$

The gain $$K_i = \frac{1}{\sqrt{1+\tan^2(\theta_i)}}$$

may be ignored at each individual iteration and applied at the end as $$K_1^n = \prod_1^n K_i = \prod_{i=1}^n \frac{1}{\sqrt{1+\tan^2(\theta_i)}}$$

This allows the use of an alternative rotation matrix Rt:

$$R'_i = \begin{bmatrix} 1 & \tan(\theta_i) \\ -\tan(\theta_i) & 1 \end{bmatrix}$$

Therefore:

$$\begin{bmatrix} x_i \\ y_i \end{bmatrix} = \begin{bmatrix} 1 & \tan(\theta_i) \\ -\tan(\theta_i) & 1 \end{bmatrix} \cdot \begin{bmatrix} x_{i-1} \\ y_{i-1} \end{bmatrix} = \begin{bmatrix} 1 & 2^{-(i-1)} \\ -2^{-(i-1)} & 1 \end{bmatrix} \cdot \begin{bmatrix} x_{i-1} \\ y_{i-1} \end{bmatrix}$$

Accounting for the rotation direction d:

$$\begin{bmatrix} x_i \\ y_i \end{bmatrix} = \begin{bmatrix} 1 & \tan(d_{i-1} \cdot \theta_i) \\ -\tan(d_{i-1} \cdot \theta_i) & 1 \end{bmatrix}.$$

-continued $$\begin{bmatrix} x_{i-1} \\ y_{i-1} \end{bmatrix} = \begin{bmatrix} 1 & d_{i-1} \cdot 2^{-(i-1)} \\ -d_{i-1} \cdot 2^{-(i-1)} & 1 \end{bmatrix} \cdot \begin{bmatrix} x_{i-1} \\ y_{i-1} \end{bmatrix}$$

where $d_{i-1} \in \{+1,-1\}=\text{sign}(\gamma_{i-1})$.

Figure 13:
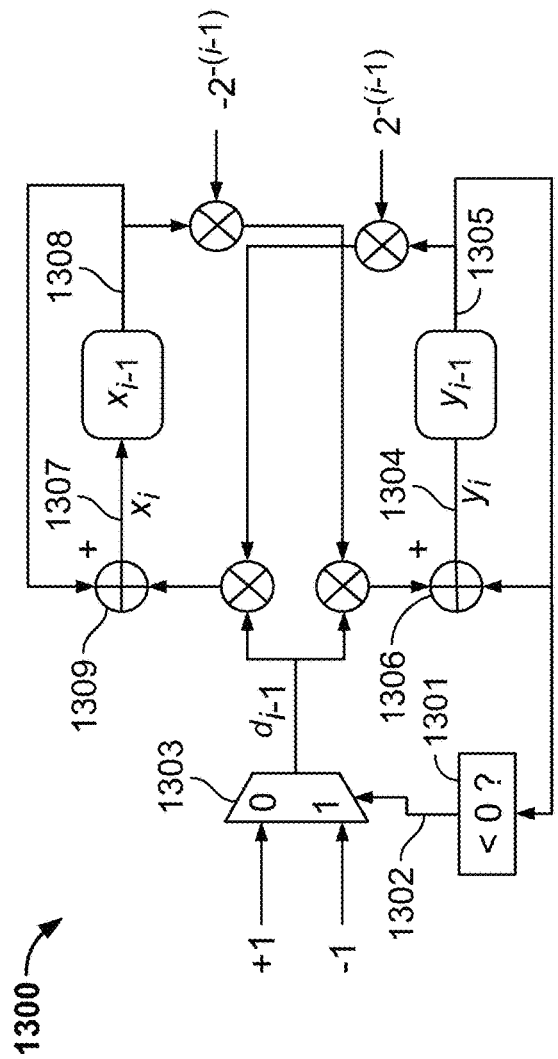
FIG. 13 is a schematic representation of vector rotation circuitry for a CORDIC implementation.

This can be implemented by circuit 1300 of FIG. 13. It is determined at 1301 whether or not $y_{i-1}$ is negative, to yield control signal 1302, which causes multiplexer 1303 to select, as $d_{i-1}$, +1 if $y_{i-1}>0$, or −1 if $y_{i-1}<0$. If $y_{i-1}=0$, the CORDIC computation ends after the $i^{th}$ iteration. $y_i$ (1304) is determined by adding or subtracting (depending on the value of $d_{i-1}$) $(x_{i-1})\times(-2^{-(i-1)})$ to or from $y_{i-1}$ (1305) at 1306, and $x_i$ (1307) is determined by adding or subtracting (depending on the value of $d_{i-1}$) $(y_{i-1})\times(2_{-(i-1)})$ to or from $x_{i-1}$ (1308) at 1309.

Figures 14, 15:
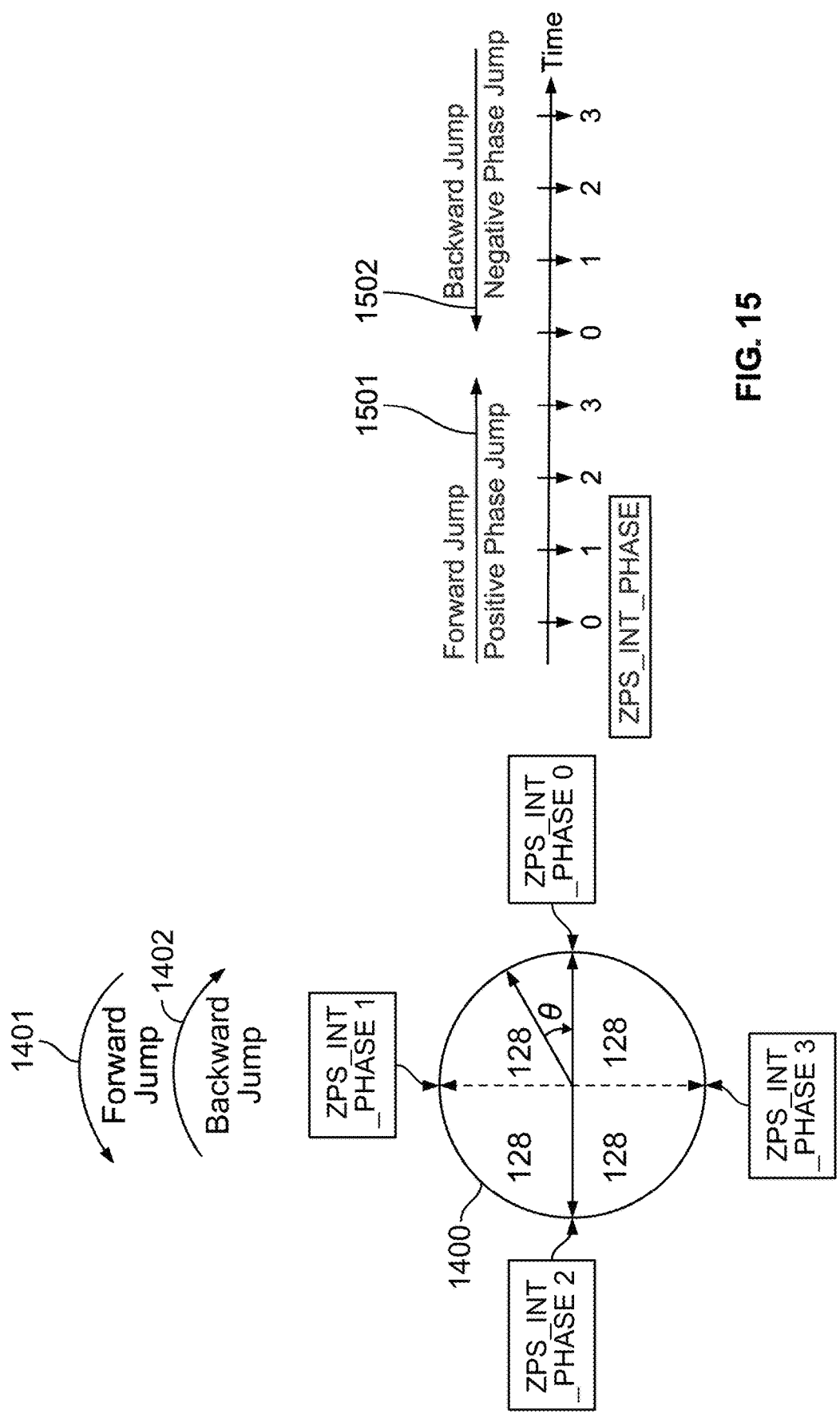
FIG. 14 is a graphical illustration of a representation of a phase jump as a CORDIC angle, for a 2T preamble.
FIG. 15 is a graphical illustration of phase jump, including direction, as a function of CORDIC angle, for a 2T preamble.
Figure 17:
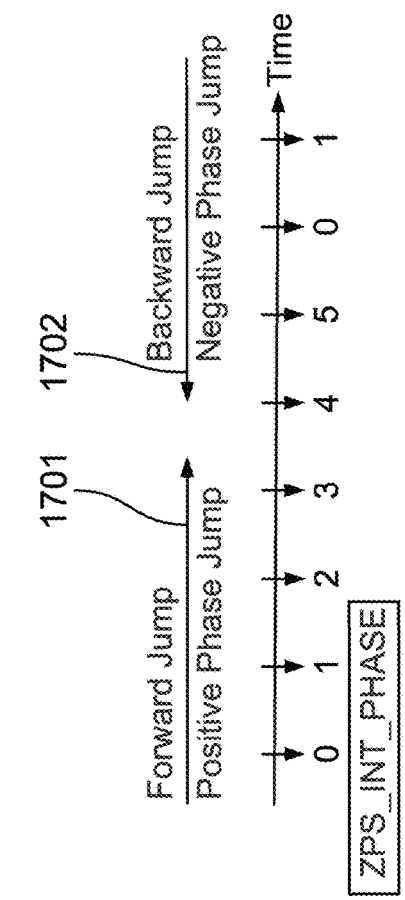
FIG. 17 is a graphical illustration of phase jump, including direction, as a function of CORDIC angle, for a 3T preamble.

In implementations of the subject matter of this disclosure, the CORDIC angle may be converted to a phase jump. As seen in FIG. 14, for a 2T preamble, 360° ($2\pi$ radians) of rotation around unit circle 1400 corresponds to 4T of phase. As seen by comparison of FIGS. 14 and 15, a forward (counterclockwise) rotation angle 1401 corresponds to a positive phase jump 1501, while a backward (clockwise) rotation angle 1402 corresponds to a negative phase jump 1502.

Figure 16:
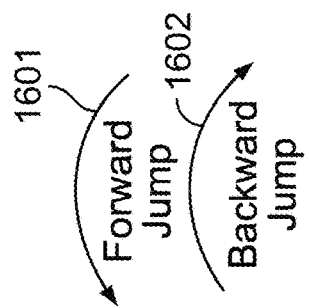
FIG. 16 is a graphical illustration of a representation of a phase jump as a CORDIC angle, for a 3T preamble.
Figure 16:
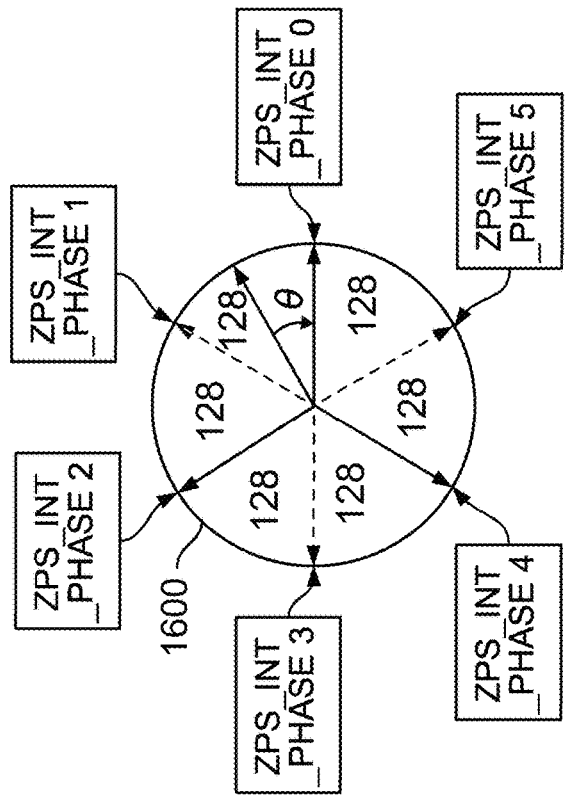

As seen in FIG. 16, for a 3T preamble, 360° ($2\pi$ radians) of rotation around unit circle 1600 corresponds to 6T of phase. As seen by comparison of FIGS. 16 and 17, a forward (counterclockwise) rotation angle 1601 corresponds to a positive phase jump 1701, while a backward (clockwise) rotation angle 1602 corresponds to a negative phase jump 1702.

As seen in FIG. 18, for a 4T preamble, 360° ($2\pi$ radians) of rotation around unit circle 1800 corresponds to 8T of phase. As seen by comparison of FIGS. 18 and 19, a forward (counterclockwise) rotation angle 1801 corresponds to a positive phase jump 1901, while a backward (clockwise) rotation angle 1802 corresponds to a negative phase jump 1902.

The required resolution of ZPS circuitry 629 is equal to T divided by the number of increments in interpolation circuitry 710. For an interpolation filter with, e.g., 128 increments, the required resolution is T/128. For a 2T preamble, with four 90° steps around the unit circle 1400, the required resolution would be 90/128 degrees= $(\pi/2)/128$ radians. For a 3T preamble, with six 60° steps around the unit circle 1600, the required resolution would be 60/128 degrees=$(\pi/3)/128$ radians. For a 4T preamble, with eight 45° steps around the unit circle 1800, the required resolution would be 45/128 degrees=$(\pi/4)/128$ radians. As set forth above, the smallest resolution required, accounting for rounding, would be $((\pi/4)/128)/2$ radians=$0.00306796157$ radians.

The ZPS phase output can be stored in a look-up table in terms of fractions of T. For 128 increments, each increment of phase would be equal to $\pi/p$ radians where pT is the preamble pattern; thus $p \in \{2, 3, 4\}$. Measured in radians, the ZPS angle would be:

$$\theta_i = \sum_{i=1}^n p \cdot d_{i-1} \cdot LUT_i$$

where $$LUT_i = \frac{128\theta_i}{\pi},$$

and each $LUT_i$ represents pT/128

Figures 20, 21:
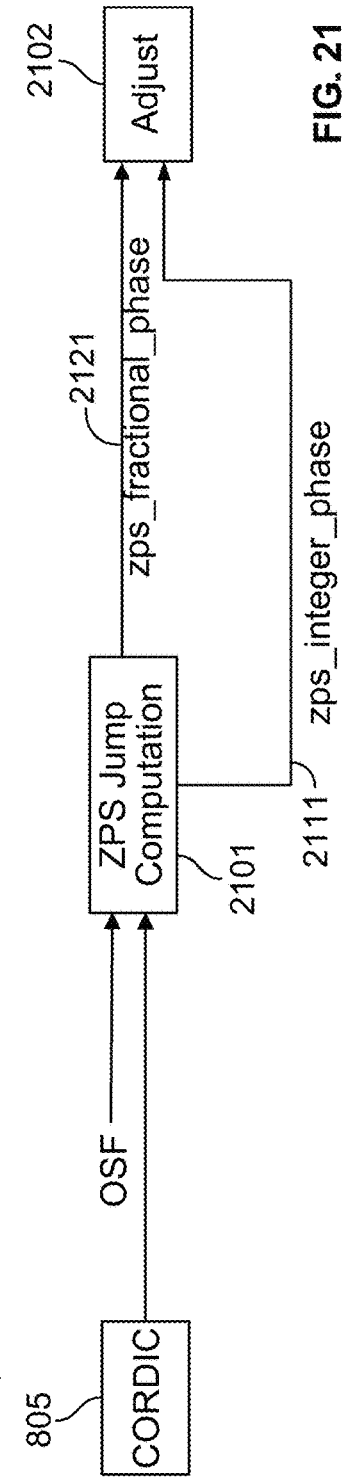
FIG. 20 is a look-up table for the incremental CORDIC angle for each successive iteration of the ZPS angle determination by the CORDIC operation, in accordance with implementations of the subject matter of this disclosure.
FIG. 21 is a schematic representation of correction of a ZPS angle to account for oversampling, in accordance with implementations of the subject matter of this disclosure.

Thus, the ZPS phase jump determination can be implemented as a look-up table with nine entries (as noted above, ten CORDIC steps are needed but the first step is trivial). Only one look-up table is needed for all of the 2T, 3T and 4T cases. The $LUT_i$ value in the look-up table may be multiplied by p (i.e., by 2, 3 or 4) depending on the preamble tone value. One such look-up table (LUT) 2000 is shown in FIG. 20. In LUT 2000, four extra bits of resolution are added so that the resolution is T/(128×4)=T/512.

The interpolation filter runs in the oversampled clock domain 751. Therefore, once the ZPS angle is determined from the CORDIC operation (whether implemented as a look-up table or not), the ZPS angle must be adjusted by the oversampling factor OSF. If, for example:

$$\theta_{read} = (1+OSF/128) \cdot \theta_{write}$$

then $$ZPS\_JUMP = (1+OSF/128) \cdot \text{fractional portion of } ZPS\_Angle$$

This correction is applied only to any fractional ZPS angle after subtracting all integer multiples of 360° from the ZPS angle.

One implementation 2100 for application of this correction is seen in FIG. 21. After CORDIC circuitry 805, the angle is converted to a phase jump in the time domain in ZPS Jump Computation circuitry 2101. The integer part 2111 of the phase jump and the final fractional portion 2121 of the phase jump are combined at 2102.

Figure 22:
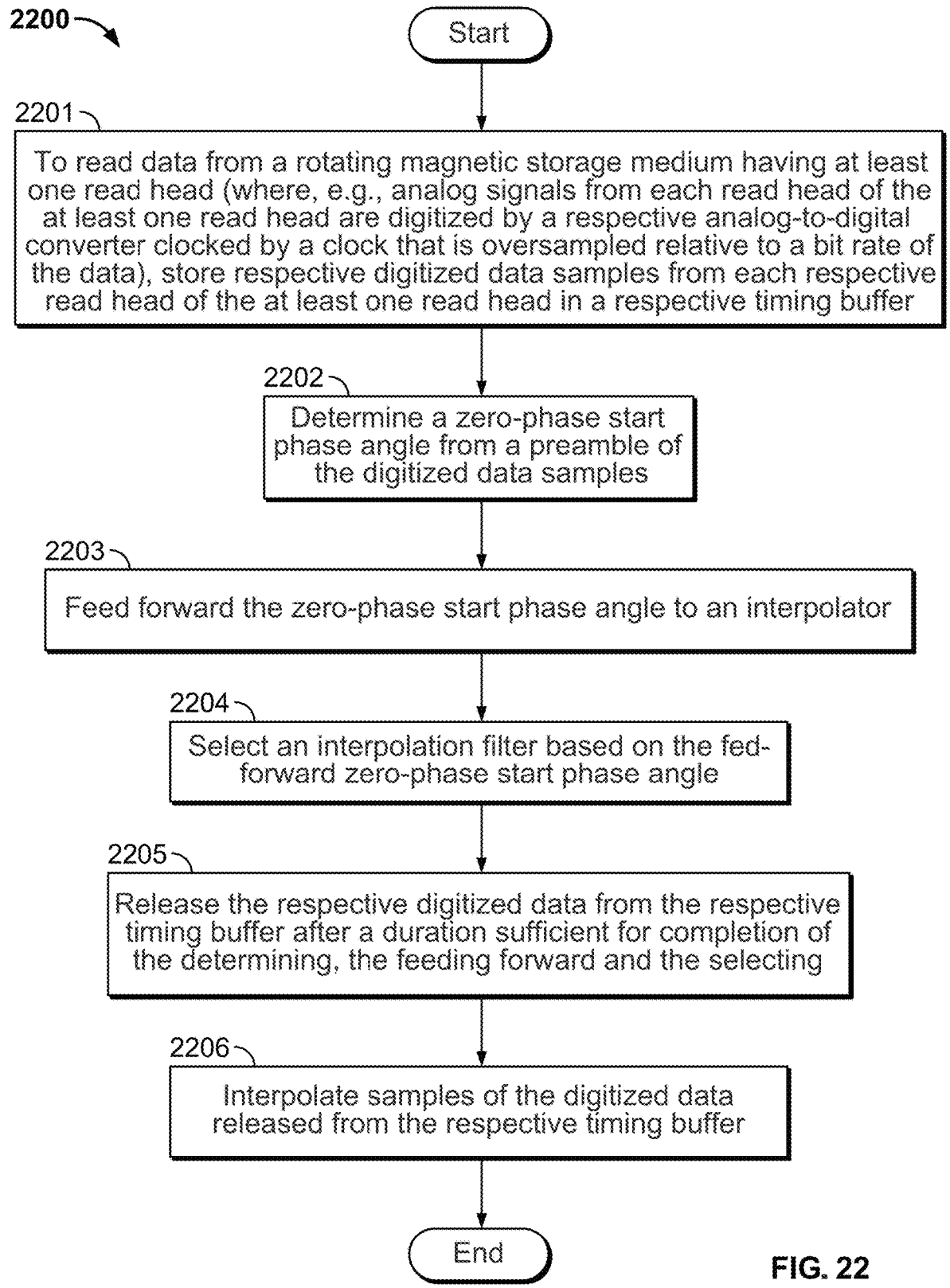
FIG. 22 is a flow diagram illustrating a method in accordance with implementations of the subject matter of this disclosure.

A method 2200 according to implementations of the subject matter of this disclosure is diagrammed in FIG. 22. Method 2200 begins at 2201, where, to read data from a rotating magnetic storage medium having at least one read head, where analog signals from each read head of the at least one read head are digitized by a respective analog-to-digital converter clocked by a clock that is oversampled relative to a bit rate of the data, respective digitized data samples from each respective read head of the at least one read head are stored in a respective timing buffer. At 2202, a zero-phase start phase angle is determined from a preamble of the digitized data samples. At 2203, the zero-phase start phase angle is fed forward to an interpolator. At 2204, an interpolation filter is selected based on the fed-forward zero-phase start phase angle. At 2205, the respective digitized data is released from the respective timing buffer after a duration sufficient for completion of the determining, the feeding forward and the selecting. At 2206, samples of the digitized data released from the respective timing buffer are interpolated. Method 2200 then ends.

Thus it is seen that a digital timing recovery technique for use in the read channel of a hard disk drive, to increasing the area available for user data on a hard disk drive by reducing the latency of digital timing recovery, thereby reducing the amount of disk area devoted to preamble data, has been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method of reading data from a rotating magnetic storage medium having at least one read head, the method comprising:
   storing respective digitized data samples from each respective read head of the at least one read head in a respective timing buffer;
   determining a zero-phase start phase angle from a preamble of the digitized data samples;
   feeding forward the zero-phase start phase angle to an interpolator;
   selecting an interpolation filter based on the fed-forward zero-phase start phase angle;
   releasing the respective digitized data from the respective timing buffer after a duration sufficient for completion of the determining, the feeding forward and the selecting; and
   interpolating samples of the digitized data released from the respective timing buffer.

2. The method of reading data according to claim 1, further comprising, where analog signals from each read head of the at least one read head are digitized at a clock rate that is oversampled relative to a bit rate of the data:
   phase-rotating the digitized data prior to the determining, to account for the oversampled clock; wherein:
   the releasing occurs after a duration sufficient for completion of the phase-rotating, the determining, the feeding forward and the selecting.

3. The method of reading data according to claim 1, further comprising, when the at least one read head comprises more than one read head, delaying signals from at least one of the at least one read head to align the signals before the storing.

4. The method of reading data according to claim 1, further comprising:
   equalizing the interpolated samples;
   detecting data bits from the interpolated samples;
   detecting timing error between the interpolated samples and the data bits; and
   deriving a bit rate from the timing error; wherein:
   selecting the interpolation filter is based also on the bit rate.

5. The method of reading data according to claim 4, where analog signals from each read head of the at least one read head are digitized at a clock rate that is oversampled relative to a bit rate of the data, the method further comprising, prior to equalization:
   storing the interpolated samples in a FIFO buffer based on the oversampled clock; and
   reading the interpolated samples from the FIFO buffer at the bit rate.

6. The method of reading data according to claim 1, wherein determining a zero-phase start phase angle from the preamble of the digitized data comprises:
   performing a Discrete Fourier Transform operation on the preamble of the digitized data;
   deriving cosine values and sine values from the Discrete Fourier Transform operation; and
   performing a CORDIC operation on the cosine values and the sine values to derive the zero-phase start phase angle.

7. The method of reading data according to claim 6, wherein performing the CORDIC operation comprises performing a number of CORDIC rotations determined by a desired precision.

8. The method of reading data according to claim 6, wherein deriving the cosine values and the sine values from the Discrete Fourier Transform operation comprises:

applying cosine coefficients from the Discrete Fourier Transform to each of the digitized data samples and accumulating the cosine values; and applying sine coefficients from the Discrete Fourier Transform to each of the digitized data samples and accumulating the sine values.

9. The method of reading data according to claim 8 wherein accumulating the cosine values and accumulating the sine values vary according to a tone of the preamble.

10. The method of reading data according to claim 6, further comprising converting the zero-phase start phase angle to a phase jump.

11. The method of reading data according to claim 10, wherein converting the zero-phase start phase angle to a phase jump comprises looking up a phase jump value in a look-up table.

12. The method of reading data according to claim 10, further comprising correcting the phase jump to account for the oversampling.

13. The method of reading data according to claim 12, wherein correcting the phase jump to account for the oversampling comprises:
   correcting an integer portion of the zero-phase start phase angle in an angle domain; and
   correcting a fractional portion of the zero-phase start phase angle in a phase domain.

14. A storage device, comprising:
   a rotating storage medium on which data is written;
   at least one read head;
   a respective timing buffer configured to store respective digitized data samples from each respective read head of the at least one read head;
   zero-phase start circuitry configured to determine a zero-phase start phase angle from a preamble of the digitized data samples; and
   interpolator circuitry, output of the zero-phase start circuitry being fed forward to the interpolator circuitry, the interpolator circuitry including an interpolation filter configured to be selected based on the fed-forward zero-phase start phase angle; wherein:
   the respective digitized data is released from the respective timing buffer after a duration sufficient for completion of operation of the zero-phase start circuitry and the interpolator circuitry; and
   the interpolator circuitry is configured to interpolate samples of the digitized data released from the respective timing buffer.

15. The storage device of claim 14, further comprising:
   a respective analog-to-digital converter configured to digitize analog signals from a respective read head of the at least one read head, each respective analog-to-digital converter clocked by a clock that is oversampled relative to a bit rate of the data; and
   phase-rotation circuitry configured to phase-rotate the digitized data prior to input to the zero-phase start circuitry, to account for the oversampled clock; wherein:
   the duration is further sufficient to account for completion of the phase-rotating.

16. The storage device of claim 14 wherein:
   the at least one read head comprises more than one read head; the storage device further comprising:
   delay circuitry configured to delay signals from at least one of the at least one read head to align the signals before storage in the respective timing buffers.

17. The storage device of claim 14, further comprising:
   equalization circuitry configured to filter the interpolated samples;
   a data detector configured to detect data bits from the interpolated samples;
   error-detecting circuitry configured to detect timing error between the interpolated samples and the data bits; and
   a timing loop configured to derive a bit rate from the timing error; wherein:
   the interpolator circuitry is configured to select an interpolation filter based on the bit rate.

18. The storage device of claim 17, further comprising:
   a respective analog-to-digital converter configured to digitize analog signals from a respective read head of the at least one read head, each respective analog-to-digital converter clocked by a clock that is oversampled relative to a bit rate of the data; and
   a FIFO buffer configured to store the interpolated samples based on the oversampled clock, and to output the interpolated samples at the bit rate.

19. The storage device of claim 14, wherein the zero-phase start circuitry comprises:
   Discrete Fourier Transform circuitry configured to operate on the preamble of the digitized data;
   cosine accumulator circuitry configured to derive cosine values from output of the Discrete Fourier Transform circuitry;
   sine accumulator circuitry configured to derive sine values from output of the Discrete Fourier Transform circuitry; and
   CORDIC circuitry configured to operate on the cosine values and the sine values to derive the zero-phase start phase angle.

20. The storage device of claim 19, wherein the CORDIC circuitry is configured to perform a number of CORDIC rotations determined by a desired precision.

21. The storage device of claim 19, wherein the cosine accumulator circuitry and the sine accumulator circuitry vary according to a tone of the preamble.

22. The storage device of claim 19 further comprising circuitry configured to convert the zero-phase start phase angle to a phase jump.

23. The storage device of claim 22, wherein the circuitry configured to convert the zero-phase start phase angle to a phase jump comprises a look-up table.

24. The storage device of claim 22 further comprising circuitry configured to correct the phase jump to account for the oversampling.

25. The storage device of claim 24, wherein the circuitry configured to correct the phase jump to account for the oversampling is configured to correct an integer portion of the zero-phase start phase angle in an angle domain, and to correct a fractional portion of the zero-phase start phase angle in a phase domain.

26. A storage device, comprising:
   rotating storage means on which data is written;
   at least one read head means;
   respective timing buffer means configured to store respective digitized data samples from each respective read head means of the at least one read head means;
   zero-phase start means configured to determine a zero-phase start phase angle from a preamble of the digitized data samples; and
   interpolator means, output of the zero-phase start circuitry means being fed forward to the interpolator means, the interpolator means including interpolation filter means configured to be selected based on the fed-forward zero-phase start phase angle; wherein:

the respective digitized data is released from the respective timing buffer means after a duration sufficient for completion of operation of the zero-phase start means and the interpolator means; and the interpolator means is configured to interpolate samples of the digitized data released from the respective timing buffer means.

27. The storage device of claim 26, further comprising:
a respective analog-to-digital converter means configured to digitize analog signals from a respective read head means of the at least one read head means, each respective analog-to-digital converter means clocked by clock means that is oversampled relative to a bit rate of the data; and phase-rotation means configured to phase-rotate the digitized data prior to input to the zero-phase start means, to account for the oversampled clock; wherein:

the duration is further sufficient to account for completion of the phase-rotating.

28. The storage device of claim 26 wherein:
the at least one read head means comprises more than one read head means; the storage device further comprising:

delay means configured to delay signals from at least one of the at least one read head means to align the signals before storage in the respective timing buffer means.

29. The storage device of claim 26, further comprising:
equalization means configured to filter the interpolated samples;

data detector means configured to detect data bits from the interpolated samples;

error-detecting means configured to detect timing error between the interpolated samples and the data bits; and timing loop means configured to derive a bit rate from the timing error; wherein:

the interpolator means is configured to select an interpolation filter based on the bit rate.

30. The storage device of claim 29, further comprising:
respective analog-to-digital converter means configured to digitize analog signals from a respective read head means of the at least one read head means, each respective analog-to-digital converter means clocked by a clock that is oversampled relative to a bit rate of the data; and FIFO buffer means configured to store the interpolated samples based on the oversampled clock, and to output the interpolated samples at the bit rate.

31. The storage device of claim 26, wherein the zero-phase start means comprises:

Discrete Fourier Transform means configured to operate on the preamble of the digitized data;

cosine accumulator means configured to derive cosine values from output of the Discrete Fourier Transform means;

sine accumulator means configured to derive sine values from output of the Discrete Fourier Transform means; and CORDIC means configured to operate on the cosine values and the sine values to derive the zero-phase start phase angle.

32. The storage device of claim 31, wherein the CORDIC means is configured to perform a number of CORDIC rotations determined by a desired precision.

33. The storage device of claim 31, wherein the cosine accumulator means and the sine accumulator means vary according to a tone of the preamble.

34. The storage device of claim 31 further comprising means configured to convert the zero-phase start phase angle to a phase jump.

35. The storage device of claim 34, wherein the means configured to convert the zero-phase start phase angle to a phase jump comprises look-up table means.

36. The storage device of claim 34 further comprising means configured to correct the phase jump to account for the oversampling.

37. The storage device of claim 36, wherein the means configured to correct the phase jump to account for the oversampling is configured to correct an integer portion of the zero-phase start phase angle in an angle domain, and to correct a fractional portion of the zero-phase start phase angle in a phase domain.

* * * * *